United States Patent [19]

Bossaert et al.

[11] Patent Number: 5,426,582
[45] Date of Patent: Jun. 20, 1995

[54] DISPLAY AND GRADATION CORRECTION CURVE SETTING METHOD FOR OPERATION THEREOF

[75] Inventors: Jean Bossaert, Ablis; Philippe Bodelet, Arpajon, both of France

[73] Assignee: GE Medical Systems S.A., Buc, France

[21] Appl. No.: 116,278

[22] Filed: Sep. 1, 1993

[30] Foreign Application Priority Data

Sep. 1, 1992 [FR] France ................ 92 10456

[51] Int. Cl.⁶ .................................. G06F 15/42
[52] U.S. Cl. ................. 364/413.22; 364/413.13; 364/413.14; 364/413.23; 358/447; 358/461; 358/522
[58] Field of Search ........... 364/413.13, 413.14, 364/413.22, 413.23; 358/461, 447, 522; 378/98.6; 395/132; 128/653.1; 345/114, 147, 150, 153

[56] References Cited

U.S. PATENT DOCUMENTS

| | | | |
|---|---|---|---|
| 3,974,386 | 8/1976 | Mistrette et al. | 378/98.11 |
| 4,006,627 | 2/1977 | Bossaert | 73/608 |
| 4,021,673 | 5/1977 | Bossaert | 364/413.14 |
| 4,032,787 | 6/1977 | Albert | 378/98.6 |
| 4,356,398 | 10/1982 | Komaki et al. | 250/582 |
| 4,450,478 | 5/1984 | Ledley | 378/98.12 |
| 4,476,497 | 10/1984 | Oshikoshi et al. | 358/298 |
| 4,551,679 | 11/1985 | Bossaert | 324/309 |
| 4,641,267 | 2/1987 | Asai et al. | 364/413.13 |
| 4,792,760 | 12/1988 | Jacob et al. | 324/322 |
| 4,937,682 | 6/1990 | Dalton | 358/461 |
| 5,055,791 | 10/1991 | LeRoux et al. | 324/318 |

FOREIGN PATENT DOCUMENTS 0110185 6/1984 European Pat. Off. .
0376595 7/1990 European Pat. Off. .
WO88/10516 12/1988 France .

Primary Examiner—Gail O. Hayes
Assistant Examiner—Gita Shingala
Attorney, Agent, or Firm—Nilles & Nilles

[57] ABSTRACT

A method of operating a display including providing a display; acquiring an image of a structure by measuring, for each of a plurality of elements, a magnitude representing an element of the structure; providing a plurality of contrast setting control buttons including a first contrast setting button that directly and independently modifies dark parts of the image of the structure and a second contract setting button that directly and independently modifies light parts of the image of the structure; digitizing the magnitudes according to a direct mode by assigning a digitized value d representing the measured magnitude of each of the elements; displaying a direct image by assigning a luminosity l corresponding to the digitized value d of each of the elements and transmitting to the display the luminosity l of each of the elements; transforming the direct image to a transformed image by assigning to each the of elements a digital value i which corresponds to the digitized value d of each of the elements; and displaying the transformed image by assigning to each of the elements a luminosity m corresponding to the digital value i of each of the elements and transmitting to the display the luminosity m of each of the elements, the digital value d of each of the elements is converted into the digital value i of each of the elements according to a reversal function f, the reversal function f having a slope −b for zero values of d and a slope −1/a for maximum values of d, so as to transform the darkest and the most luminous parts of the direct image, the contrast setting control buttons act directly on slope −b and slope −1/a and the reversal function f is determined on the basis of slope −b and slope −1/a.

19 Claims, 2 Drawing Sheets

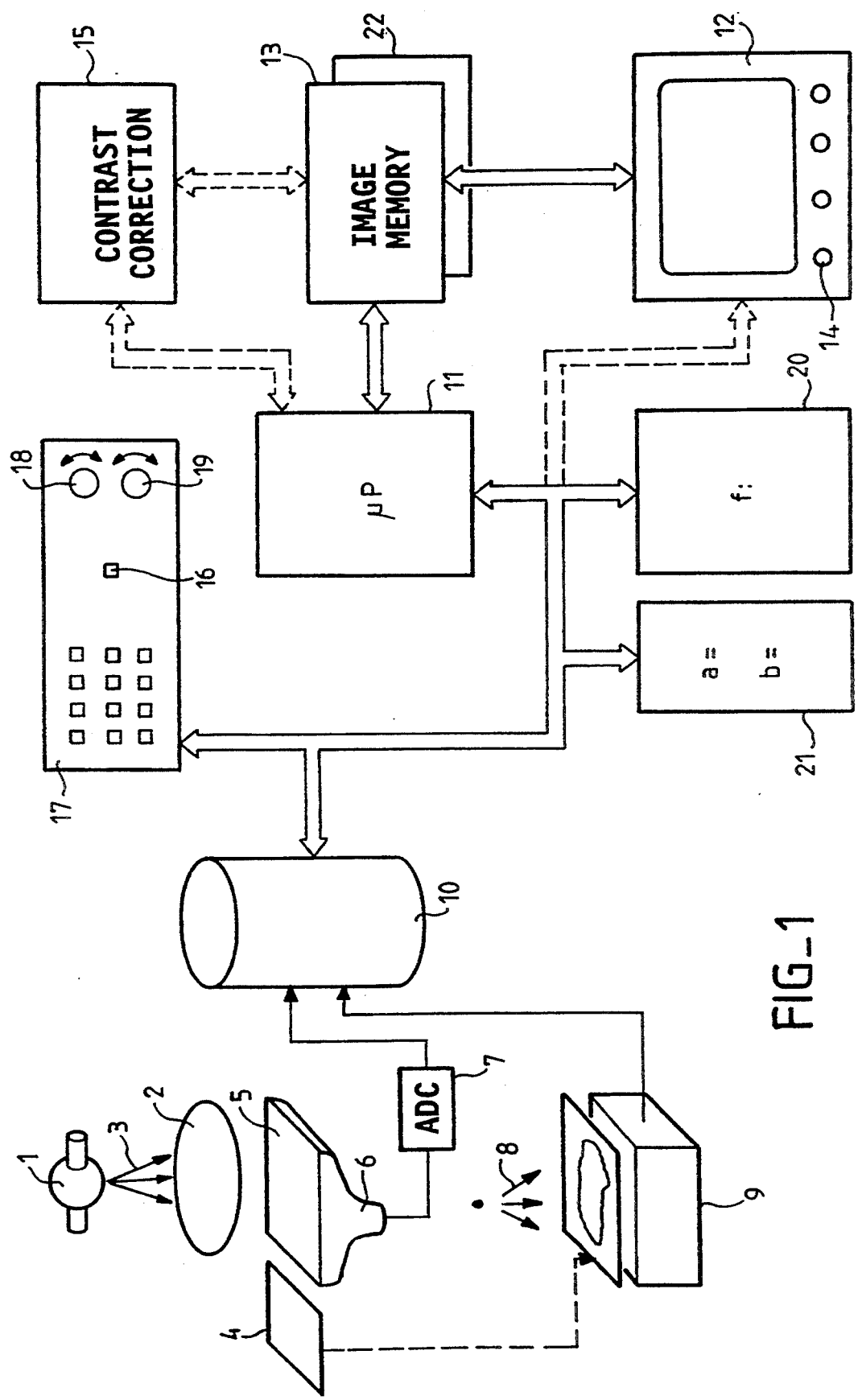
FIG_1

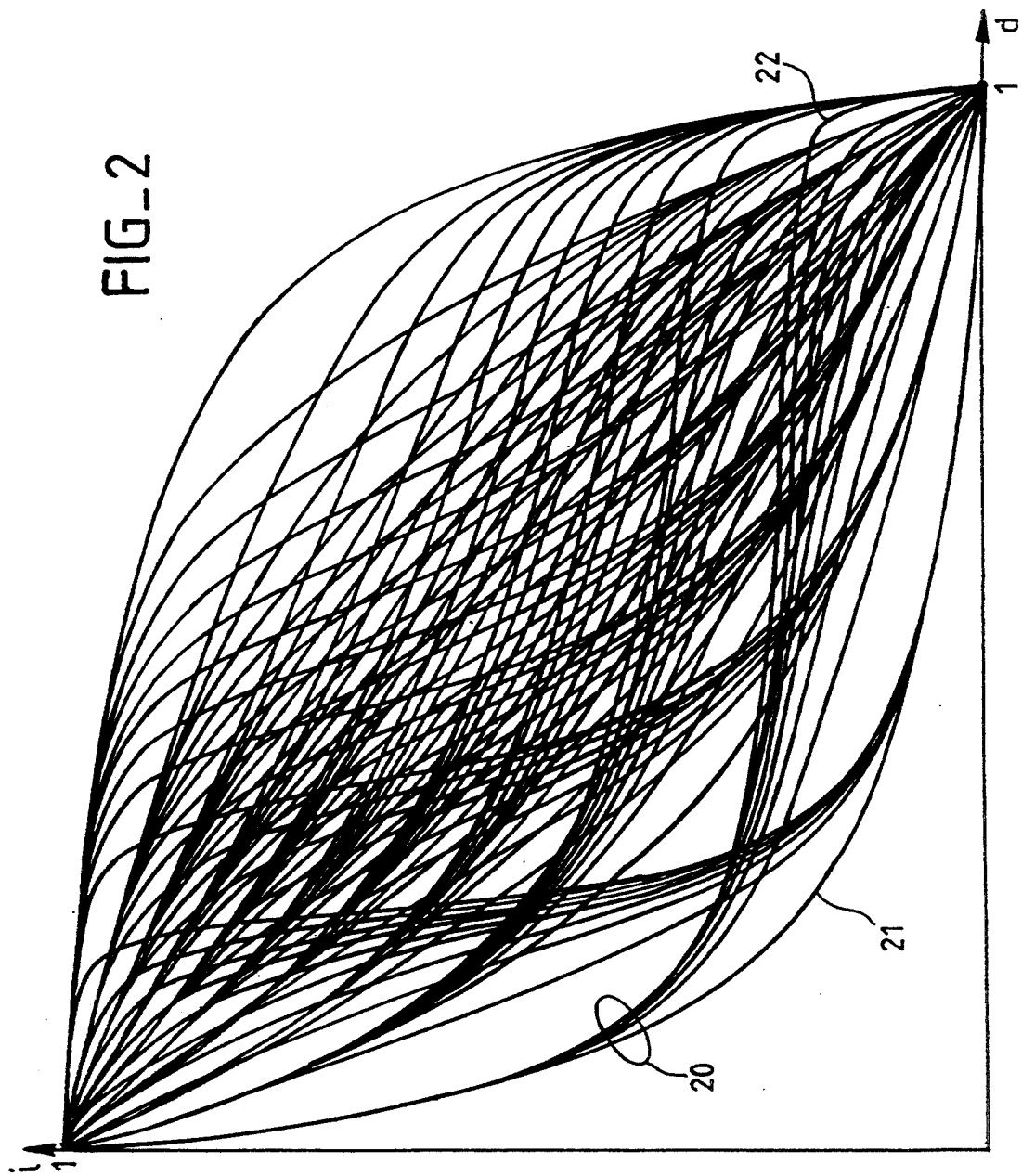

DISPLAY AND GRADATION CORRECTION CURVE SETTING METHOD FOR OPERATION THEREOF

BACKGROUND OF THE INVENTION

1. Description of the Invention

An object of the present invention is a contrast-setting or contrast-adjusting method that can be used, for example, during a contrast-reversal operation to go from an image displayed in a first mode, called a direct mode, to an image displayed in a second mode, called a reverse mode, or again to modify the contrast of a basic image. The invention is particularly applicable in the medical field where it can be used to compare radioscopic type images with radiographic type images. Nevertheless, it can be applied in other fields where, for example, for reasons of visual comfort, it is preferred to go from a direct image to a reverse image and vice versa.

In medicine, when a patient is subjected to X-radiation, there are two main ways of acquiring an image. A first method consists in placing a radiographic film on the other side of the patient with respect to the X-ray emitter. The radiosensitive layer of the film is imprinted by the radiation in varying degrees as a function of the radiological density of the parts crossed in the interposed body. After photographic development, the photograph is observed by transparency, for example by being placed against a luminous board. The image acquired under these conditions is called an image in radiographic mode. Another method consists in using a camera, or a detector of another type, to acquire an electronic image of the X-radiation that goes through the body. To this end, a target of a camera is placed after the body with respect to the X-ray emitter, and the target is read with electronic radiation. In practice, a scintillator screen is interposed between the body and the target of the camera. This scintillator screen converts the X-rays into light rays for whose passband the target is particularly sensitive. The video image thus acquired, called a radioscopic image, may be projected on the display monitor.

2. Description of the Prior Art

Owing to the different mode of acquisition of the direct image and of the image obtained by radioscopy, the contrasts of these images are reversed for one and the same examined structure. This means that the dark parts in one image are bright in the other one and vice versa. The practitioners are therefore used to making alternate examinations of an image of one type and an image of another type. It is therefore important to propose a system that enables the changing, for one and the same structure, from an image of one type to an image of another type because the practitioner may wish to look at it in a mode different from its mode of acquisition.

The images are processed notably to eliminate noise, or to make contour corrections or other corrections. As regards the contrast, several types of processing must be distinguished. One of the simplest corrections permitted by these systems is obtained by the presence of contrast-setting buttons located on the front face of the display monitors. It is possible, by acting on the luminosity and contrast buttons, to modify the appearance of the displayed image. Another correction, better known as a gamma correction, is a display correction related, firstly, to laws of vision (proper to the phenomenon of vision in the human eye) and secondly to phenomena of display (proper to the display screens used). There also exist contrast corrections that tend to increase the contrast in particular windows of contrast or even in geographic windows of the image.

The invention also relates to these latter types of processing. They could also be applied to the reverse images produced. The invention also relates to the modification or reversal of contrast. For monochromatic images (for color images, the problem is a threefold one), each image element or pixel may be assigned a value of luminosity on the screen ranging from a zero value to a maximum value. When the images are digitized, there is a known way of distributing the dynamic range of luminosity over a number $2^N$ of levels (for example 256 levels ranging from 0 to 255). The number N of bits on which an image signal is coded at an image element represents this dynamic range.

During a contrast reversal, the image elements for which the luminosity is zero are assigned the maximum luminosity level, and the elements for which the luminosity levels were the maximum are assigned a zero luminosity. The elements for which the luminosity is intermediate are assigned an intermediate luminosity. The main problem to be resolved is that of choosing a good reversal function for the intermediate luminosities. For the contrast modification, also known as windowing, it is necessary to accentuate the contrast in a window of luminosity to the detriment of the contrast in the other parts.

Two functions of reversal can be envisaged in the prior art. If d designates the signal computed for an image element in direct mode, the signal i of the reverse image could be of the $2^{N-d}$ (arithmetical reversal) or of the $2^N/(d+1)-1$ (geometrical reversal) type. However, these approaches do not truly correspond to images that can be easily interpreted. These approaches do not provide perceptible information to the practitioner's mind.

Rather than choosing simplistic functions, attempts have been made to use conversion functions of the following type:

$$i = 2^N \frac{1 - (d/2^N)^B}{1 + A\,(d/2^N)^B} \qquad \text{formula 1}$$

This group of reversal functions has been used to obtain reversed image contrasts that are desired and not imposed, without the possibility of making any changes therein. The possibility of choosing a value of A between 0 and 99 and B between 0.1 and 5 led to a large set of functions. The drawback of this method which, as it happened, appeared to be a simple one, was that practitioners did not truly have the means of understanding what they were doing in modifying the values A and B on which they were able to play. Initially, they were given systems of reversal curves corresponding to the parameters A and B. In practice, these systems of curves could hardly be understood and a plotting did not enable a sufficiently user-friendly interpretation of the coefficients A and B.

In the invention, it being known that it is possible to choose any reversal function between the minimum and the maximum (provided that this function is at least monotonic), it has been observed that ultimately the practitioners' desire was to set the contrast in the dark zones and the contrast in the light zones independently of each other. The idea of the invention then was to reverse the old ways and to ask practitioners to choose their contrast in the dark zones and in the clear zones, and then to compute the function of modification or reversal that corresponded to this choice. In other words, according to the invention, the practitioners have two commands at their disposal enabling these contrasts to be set. These settings then correspond to modifications of the appearance of the images that the human brain is capable of understanding. It is enough, for example, for a constant setting of contrast for the luminous zones, to modify the contrast of the dark zones to get an immediate view of what effect it has on the reversed image in the dark zones. Then, the best setting is chosen. Then a similar setting is made for the dark zones that become luminous by reversal. The particular feature of the invention, then, is that there is a perceptible monotonic correspondence between the action on one of the setting buttons and on the phenomenon displayed on the screen.

SUMMARY OF THE INVENTION

An object of the invention, therefore, is a method for the setting of contrast, for example during a reversal of contrast, to go from an image of a structure displayed according to a first mode called a direct mode to an image of this structure displayed according to a second mode called an reverse mode, or vice versa, or during a modification of contrast, said method comprising the following steps:
- an image of the structure is acquired by the measurement, for each element of this image, of a magnitude representing this structure;
- the values of this magnitude are digitized, according to the direct mode, by the assigning, to each element of the acquired image, of a digital value d representing the measured value;
- the direct image is displayed by the assigning, to each element of the image, of a luminosity l corresponding to this digitized value d,
- the contrast is modified or reversed by a function of modification or reversal by the assigning, in a modified or reversed image, to each element of the modified or reversed image, of a modified or reversed digitized value i which corresponds to this digitized value d,
- and the modified or reversed image is displayed by the assigning, to each element of the image, of a luminosity m corresponding to this digitized value i, wherein
- to modify or reverse the contrast, the digitized values d are converted into modified or reversed values i according to an reversal function f having slopes −b and −1/a respectively for zero and maximum values of d, and therefore playing on the darkest and the most luminous parts,
- there are provided setting buttons that act directly on these slopes,
- a function of reversal is determined on the basis of these values of slopes.

BRIEF DESCRIPTION OF THE DRAWINGS

The invention will be understood more clearly from the following description and from the accompanying figures. These figures are given purely by way of an indication and in no way restrict the scope of the invention:

FIG. 1 shows a schematic diagram of a contrast-setting system according to the invention;

FIG. 2 shows a set of systems of curves showing the development of the transfer functions with the modification of the settings.

MORE DETAILED DESCRIPTION

FIG. 1 shows a system that can be used to implement the method of the invention. It is described more particularly in an application of radiology, although this is not necessary. An X-ray tube 1 sends X-radiation 3 towards a body 2. The X-radiation 3, after having crossed the body 2, imprints a photosensitive plate 4 or, alternatively, enters the input face 5 of a camera 6. The camera 6 delivers a video signal digitized by an analog/digital converter 7. When a photosensitive plate is used, this photosensitive plate 4, after photographic development, is brought, before a light radiation 8, above a digitization device 9. The digitization device 9 may be any device but by its principle, it may include for example a set such as the set 5–7. One of the images, the image acquired by digitizing the plate 4, is traditionally called a direct image while the other image is called an reversed image. These terms are purely conventional ones. They could themselves be reversed since the method works in both directions.

The digitized images are stored in mass memories 10 of a data-processing device, for example in a hard disk or on magnetic tapes. For the display of these images, normally a microprocessor 11 prompts the extraction of the image from the medium 10 and sends them to a display monitor 12, most usually by means of an image memory 13 to which the monitor 12 is connected. The monitor 12 has contrast-setting buttons 14 referred to here above. The signal of the unprocessed digitized image stored in the medium 10 may furthermore undergo a correction in a device 15 in order to eliminate the noise, heighten the contours, window the image or for any other purpose. The contrast correction device 15 may be a circuit, or a program implemented by the microprocessor 11 in real time to load the image memory 13 with corrected image information elements. From this point of view, the depiction of FIG. 1 is symbolic.

A practitioner who looks at the image on the monitor 12 may take action, according to the invention, on a control button 16 available on a keyboard 17 and thus choose to display the direct image or the reverse image. In viewing either one of these images, he can take action on control buttons 18 and 19 in order to set, respectively, the contrast in the dark parts and in the light parts of the image. The control buttons of the keyboard 17 may be of any kind: mouse, trackball, keyboard arrows, digital keypad, etc.

An explanation shall now be given of the mode of computation of a preferred function of reversal to implement the invention. To simplify the explanation, a reduced scale of luminosity levels ranging from 0 to 1 shall be used. A definitive scale, for example one ranging from 0 to 255, can be resumed at the end of the computation. In the direct image, the luminosity measured for each element ranges from 0 to 1. In the reverse image, the luminosity should also range from 0 to 1. In obtaining this, the total dynamic range of the monitor 12 is used. The reversal function f such that $i = f(d)$ must meet the conditions:

1) $f(0) = 1$; $f(1) = 0$
2) $f'(d) < 0$, where f' is the derivative of f with respect to d: the function should be a decreasing monotonic and one-to-one function 3) $f'(0) = -b$, $f'(1) = -1/a$.

In this form, the problem may as yet imprecise. It was then decided to reinforce the second condition by a symmetry. This means that a reverse function g, which enables d to be obtained from i, $d = g(i)$, must be such that it belongs to the same group as f. In this case, g will be obtained from f by a commutation of the parameters a and b. In practice, $f_{a, b} = g_{b, a}$. This condition determines a group of functions.

To resolve this system, a changing of variables was carried out such that:

$$x = d/(1-d) \text{ and } y = i/(1-i).$$

These variables get easily reversed into:

$$b = x/(1+x) \text{ and } i = y/(A+y)$$

It was then observed that the condition of symmetry of reversal led to a simple condition.

$$ax + by = 1/x + 1/y.$$

This made it possible to deduce y with x being known, i.e. to deduce i with d being known. The following is the resulting formula:

$$y = \frac{1 - ax^2 + \sqrt{(1 - ax^2)^2 + 4bx^2}}{2bx} \quad \text{formula 2}$$

Although the choice of a symmetrical function is not necessary in principle, it has been discovered that it has a certain value. Indeed, if this choice is not made, any function whatsoever of monotonic reversal meeting the (predefined) conditions at the starting point could be accepted. On the contrary, the fact of choosing, from among all the groups of functions possible, those functions that are symmetrical and that are therefore given by the formula indicated here above makes it possible, on the basis of an information element stored in the medium 10, to make alternate displays, for the ranges of contrast that correspond to one another permanently, of the direct image and the reverse image. In other words, with the recommended choice, the user can acquire a certain degree of dexterity over the contrast reversal phenomenon through a process of learning. This helps in the interpretation of the images. Another advantage is that it is possible to commutate a and b in the memory 21, or its equivalent, to arrive at the reciprocal function.

The above function is implemented in a program contained in a memory 20 connected to the microprocessor 11. The progress of the operations of this program are as follows. The practitioner chooses values for the parameters a and b. These values are stored in a memory of parameters 21. By action on the button 16, the image stored in the memory 13 is converted into a reverse image that is either stored in this same memory 13 or in another image memory 22 which too is linked to the monitor 12 or else again is displayed directly. The button 16 can also commutate this image memory. The conversion consists in computing x from d, read in the medium 10 or the memory 13 and then y from x and from a and b contained in the memory 21. Finally, i is computed from y.

A fast method consists in the prior writing, using the chosen parameters a and b, of a table of correspondence of the 256 (or other) possible levels of the image. This table is loaded into the device 15 within some milliseconds initially. The conversion of the images is done subsequently, for each image element, by the reading of the table. This conversion is done in real time for the operator. The method of the invention lends itself also to direct analog control over the parameters a and b. It is enough to use the contrast and luminosity control buttons of the keyboard with the former button acting, for example, on the dark levels and the latter button on the lighter levels.

FIG. 2 gives a view of the system of curves arrived at by choosing for a and b respectively the values, in grades 5, 15, 25, 35, 45, 55, 65, 75, 85 and 95, in terms of slope. It can then be seen in this figure that, for a given contrast, for example for the dark parts (slope dictated by the left-hand part of the curve; constant slope of the reversal function at the point of origin), it is possible, by modifying the other coefficient pertaining to the contrast of the luminous parts, to have access to a set of curves 20 distributed between a first curve for which, in the luminous parts, the tangent is horizontal, to a last curve 21 for which the tangent is vertical. The same arrangement is found if another value of the slope of the transfer function is chosen at the point of origin.

Of course, if instead of keeping the contrast in the dark zones while making the contrast vary in the light zones, the reverse is done, i.e. if the contrast is kept in the light zones while the contrast is made to vary in the dark zones, then the systems of curves are scanned differently. In both cases, it is seen that there is a very sharp dissociation of the effects.

Consequently, there is thus constituted an independence, visible to the eye, of the setting of the contrasts in the light parts and in the dark parts. The choice for the practitioners becomes far easier. One of the aims of the invention is then achieved, namely that of physically correlating the action on a setting with the visual checking of the effects of the setting.

What is claimed is:

1. A method of operating a display comprising:
   providing a display;
   acquiring an image of a structure by measuring, for each of a plurality of elements of the image of the structure, a magnitude representing an element of the structure;
   providing a plurality of contrast setting control buttons comprising a first contrast setting button that directly and independently modifies dark parts of the image of the structure and a second contrast setting button that directly and independently modifies light parts of the image of the structure;
   digitizing the magnitude of each of said plurality of elements according to a direct mode by assigning to each of said plurality of elements a digitized value d representing the measured magnitude of each of said plurality of elements;
   displaying a direct image on the display by assigning to each of said plurality of elements a luminosity l corresponding to the digitized value d of each of said plurality of elements and transmitting to the display the luminosity l of each of said plurality of elements;
   transforming the direct image to a transformed image by assigning to each of said plurality of elements a digital value i which corresponds to the digitized value d of each of said plurality of elements; and displaying the transformed image on the display by assigning to each of said plurality of elements a luminosity m corresponding to the digital value i of each of said wherein the digital value d of each of said plurality of elements is converted into the digital value i of each of said plurality of elements according to a reversal function f, said reversal function f having a slope $-b$ for zero values of d and a slope $-1/a$ for maximum values of d, to transform the darkest and the most luminous parts of the direct image, and whereby the plurality of contrast setting control buttons act directly on slope $-b$ and slope $-1/a$ and the reversal function f is determined on the basis of slope $-b$ and slope $-1/a$.

2. A method according to claim 1, wherein the reversal function f is chosen with a slope $-b$ and a slope $-1/a$ such that a reverse function g of the reversal function f is an identical function, but with coefficients $-1/a$ and $-b$ respectively.

3. A method according to claim 1 wherein transforming the image comprises reversing the contrast and the digitized value d of each of said plurality of elements is convened into a reverse digital value i according to a reversal function f where:

$$y = \frac{1 - ax^2 + \sqrt{(1 - ax^2)^2 + 4bx^2}}{2bx},$$

$x = d/(1 - d)$ and $y = i/(1 - i)$.

4. A method according to claim 1, further comprising providing a conversion table, wherein each of said plurality of elements is transformed successively by machine reading of the conversion table.

5. A method according to claim 1, further comprising providing a radiological image, wherein acquiring the image of the structure by measuring a magnitude representing an element of the structure comprises measuring a magnitude of an element of the radiological image.

6. A method according to claim 2 wherein transforming the image comprises reversing the contrast and the digitized value d of each of said plurality of elements is converted into a reverse digital value i according to a reversal function f where:

$$y = \frac{1 - ax^2 + \sqrt{(1 - ax^2)^2 + 4bx^2}}{2bx},$$

$x = d/(1 - d)$ and $y = i/(1 - i)$.

7. A method according to claim 2, further comprising providing a conversion table, wherein each of said plurality of elements is transformed successively by machine reading of the conversion table.

8. A method according to claim 2, further comprising providing a radiological image, wherein acquiring the image of the structure by measuring a magnitude representing an element of the structure comprises measuring a magnitude of an element of the radiological image.

9. A method of operating a display comprising:
providing a means for display;
providing a machine readable conversion table;
acquiring an image of a structure by measuring, for each of a plurality of elements of the image of the structure, a magnitude representing an element of the structure;

providing a plurality of control button means comprising a first contrast setting button that directly and independently modifies dark parts of the image of the structure and a second contrast setting button that directly and independently modifies light parts of the image of the structure;

digitizing the magnitude of each of said plurality of elements according to a direct mode by assigning to each of said plurality of elements a digitized value d representing the measured magnitude of each of said plurality of elements;

displaying a direct image on the display by assigning to each of said plurality of elements a luminosity l corresponding to the digitized value d of each of said plurality of elements and transmitting to the means for display the luminosity l of each of said plurality of elements, transforming the direct image to a transformed image by assigning to each of said plurality of elements a digital value i which corresponds to the digitized value d of each of said plurality of elements; and displaying the transformed image on the display by assigning to each of said plurality of elements a luminosity m corresponding to the digital value i of each of said plurality of elements and transmitting to the means for display the luminosity m of each of said plurality of elements, wherein the digital value d of each of said plurality of elements is converted into the digital value i of each of said plurality of elements according to a reversal function f, said reversal function f being stored in the conversion table and having a slope $-b$ for zero values of d and a slope $-1/a$ for maximum values of d, [so as]to transform the darkest and the most luminous parts of the direct image, arid Whereby the plurality of control button means for contrast setting act directly on slope $-b$ and slope $-1/a$ and the reversal function f is determined on the basis of slope $-b$ and slope $-1/a$.

10. The method according to claim 9, wherein the reversal function f is chosen with a slope $-b$ and a slope $-1/a$ such that a reverse function g of the reversal function f is an identical function, but with coefficients $-1/a$ and $-b$, respectively.

11. The method according to claim 9 wherein transforming the image comprises reversing the contrast and the digitized value d of each of said plurality of elements is convened into a reverse digital value i according to a reversal function f where:

$$y = \frac{1 - ax^2 + \sqrt{(1 - ax^2)^2 + 4bx^2}}{2bx},$$

$x = d/(1 - d)$ and $y = i/(1 - i)$.

12. The method according to claim 9, further comprising providing a conversion table, wherein each of said plurality of elements is transformed successively by machine reading of the conversion table.

13. The method according to claim 9, further comprising providing a radiological image, wherein acquiring the image of the structure by measuring a magnitude representing an element of the structure comprises measuring a magnitude of an element of the radiological image.

14. The method according to claim 10 wherein transforming the image comprises reversing the contrast and the digitized value d of each of said plurality of elements is convened into a reverse digital value i according to a reversal function f where:

$$y = \frac{1 - ax^2 + \sqrt{(1 - ax^2)^2 + 4bx^2}}{2bx},$$

$x = d/(1 - d)$ and $y = i/(1 - i)$.

15. The method according to claim 10, further comprising providing a radiological image, wherein acquiring the image of the structure by measuring a magnitude representing an element of the structure comprises measuring a magnitude of an element of the radiological image.

16. Apparatus comprising:
a display;
a plurality of contrast setting control buttons;
means for acquiring an image of a structure by measuring, for each of a plurality of elements of the image of the structure, a magnitude representing an element of the structure;
means for digitizing the magnitude of each of said plurality of elements according to a direct mode by assigning to each of said plurality of elements a digitized value d representing the measured magnitude of each of said plurality of elements;
means for displaying a direct image on the display by assigning to each of said plurality of elements a luminosity l corresponding to the digitized value d of each of said plurality of elements and transmitting to the display the luminosity l of each of said plurality of elements;
means for transforming the direct image to a transformed image by assigning to each of said plurality of elements a digital value i which corresponds to the digitized value d of each of said plurality of elements; and
means for displaying the transformed image on the display by assigning to each of said plurality of elements a luminosity m corresponding to the digital value i of each of said plurality of elements and transmitting to the display the luminosity m of each of said plurality of elements
wherein the digital value d of each of said plurality of elements is converted into the digital value i of each of said plurality of elements according to a reversal function f, said reversal function f having a slope $-b$ for zero values of d and a slope $-1/a$ for maximum values of d, to transform the darkest and the most luminous parts of the direct image, and whereby the plurality of control button means for contrast setting act directly on slope $-b$ and slope $-1/a$ and the reversal function f is determined on the basis of slope $-b$ and slope $-1/a$.

17. The apparatus of claim 16 wherein the means for transforming the image comprises means for converting the digitized value d of each of said plurality of elements into a reverse digital value i according to a reversal function f where:

$$y = \frac{1 - ax^2 + \sqrt{(1 - ax^2)^2 + 4bx^2}}{2bx},$$

$x = d/(1 - d)$ and $y = i/(1 - i)$.

18. The apparatus of claim 16 further comprising a conversion table, wherein the means for transforming comprises means for reading of the conversion table.

19. The apparatus of claim 16 further comprising means for producing X-rays and means for acquiring a radiological image, wherein the means for acquiring the image of the structure by measuring a magnitude representing an element of the structure comprises means for measuring a magnitude of an element of the radiological image.

* * * * *